(12) United States Patent
Xiao et al.

(10) Patent No.: US 11,295,466 B2
(45) Date of Patent: Apr. 5, 2022

(54) METHOD AND APPARATUS FOR ESTIMATING DEPTH OF BINOCULAR IMAGE, DEVICE, PROGRAM, AND MEDIUM

(71) Applicant: SHENZHEN SENSETIME TECHNOLOGY CO., LTD., Shenzhen (CN)

(72) Inventors: Ruichao Xiao, Shenzhen (CN); Wenxiu Sun, Shenzhen (CN); Chengxi Yang, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 68 days.

(21) Appl. No.: 16/858,824

(22) Filed: Apr. 27, 2020

(65) Prior Publication Data

US 2020/0258250 A1 Aug. 13, 2020

Related U.S. Application Data

(63) Continuation of application No. PCT/CN2019/082549, filed on Apr. 12, 2019.

(30) Foreign Application Priority Data

Jul. 27, 2018 (CN) .......................... 201810847268.7

(51) Int. Cl.
*G06T 7/593* (2017.01)
*G06N 3/08* (2006.01)

(52) U.S. Cl.
CPC ............... *G06T 7/593* (2017.01); *G06N 3/08* (2013.01); *G06T 2207/10028* (2013.01); *G06T 2207/20084* (2013.01)

(58) Field of Classification Search
CPC combination set(s) only.
See application file for complete search history.

(56) References Cited

U.S. PATENT DOCUMENTS 9,280,828 B2 3/2016 Ogata
10,003,787 B1 6/2018 Wan
(Continued)

FOREIGN PATENT DOCUMENTS

CN 102523464 A 6/2012
CN 102609936 A 7/2012
(Continued)

OTHER PUBLICATIONS

International Search Report in the international application No. PCT/CN2019/082549, dated Jul. 19, 2019, 2 pgs.
(Continued)

*Primary Examiner* — Cindy Trandai
(74) *Attorney, Agent, or Firm* — Cooper Legal Group, LLC (57) ABSTRACT

A method and apparatus for estimating the depth of a binocular image, a device, a program, and a medium are provided. The method includes: inputting a to-be-processed binocular image into a predetermined neural network to obtain a parallax image and a confidence score image thereof, where a discrete parameter of each pixel in a preset distribution in the parallax image has a negative correlation with a confidence score of the pixel; and obtaining a depth image of the to-be-processed binocular image according to the parallax image.

18 Claims, 4 Drawing Sheets

Obtain a likelihood function related to a predetermined neural network parameter based on the parallax image of the to-be-processed binocular image and the confidence score image thereof as well as the predetermined neural network parameter and a real parallax image — 202

Obtain a negative correlation between a confidence score of each pixel in the parallax image and a discrete parameter of the pixel in a preset distribution based on the preset distribution to which each pixel in the parallax image conforms — 204

In response to the predetermined neural network parameter conforming to the preset distribution and the confidence score of each pixel in the parallax image conforming to a non-decreasing distribution, take, based on the negative correlation between the confidence score of each pixel in the parallax image and the discrete parameter of the pixel in the preset distribution, a negative logarithm of the likelihood function to obtain a loss function — 206

(56) References Cited

U.S. PATENT DOCUMENTS

| | | | |
|---|---|---|---|
| 2012/0105609 A1 | 5/2012 | Qi | |
| 2012/0308119 A1 | 12/2012 | Ogata | |
| 2012/0321171 A1* | 12/2012 | Ito | H04N 13/239 382/154 |
| 2013/0050412 A1* | 2/2013 | Shinohara | H04N 13/128 348/42 |
| 2013/0107207 A1 | 5/2013 | Zhao | |
| 2014/0267243 A1 | 9/2014 | Venkataraman et al. | |
| 2017/0147905 A1* | 5/2017 | Huang | G06K 9/6232 |
| 2017/0272651 A1* | 9/2017 | Mathy | H04N 13/257 |
| 2018/0075628 A1* | 3/2018 | Teare | G06K 9/6274 |
| 2018/0091768 A1* | 3/2018 | Adsumilli | H04N 7/0127 |
| 2018/0176543 A1 | 6/2018 | Wan | |
| 2018/0204111 A1* | 7/2018 | Zadeh | G06N 3/0436 |
| 2018/0211402 A1 | 7/2018 | Ciurea et al. | |
| 2018/0240235 A1* | 8/2018 | Mazo | G06T 7/0012 |
| 2018/0247107 A1* | 8/2018 | Murthy | G06K 9/4628 |
| 2018/0262683 A1* | 9/2018 | Meier | H04N 5/265 |
| 2019/0001910 A1* | 1/2019 | Motohashi | G06K 9/00791 |
| 2019/0197196 A1* | 6/2019 | Yang | G06F 30/00 |
| 2019/0205643 A1* | 7/2019 | Liu | G06T 7/73 |
| 2019/0354746 A1* | 11/2019 | Zhang | G06K 9/00268 |
| 2019/0385360 A1* | 12/2019 | Yang | G06T 17/05 |
| 2020/0020097 A1* | 1/2020 | Do | G06N 3/0454 |
| 2020/0117993 A1* | 4/2020 | Martinez-Canales | G06K 9/6262 |
| 2020/0388028 A1* | 12/2020 | Agus | G16H 50/20 |
| 2021/0224977 A1* | 7/2021 | Jia | G16H 30/40 |

FOREIGN PATENT DOCUMENTS

| | | |
|---|---|---|
| CN | 102821290 A | 12/2012 |
| CN | 103424105 A | 12/2013 |
| CN | 103731651 A | 4/2014 |
| CN | 104662896 A | 5/2015 |
| CN | 105096300 A | 11/2015 |
| CN | 106683182 A | 5/2017 |
| CN | 108269273 A | 7/2018 |
| CN | 109191512 A | 1/2019 |
| EP | 2509324 A1 | 10/2012 |
| TW | 201712639 A | 4/2017 |

OTHER PUBLICATIONS

"Improved Stereo Matching with Constant Highway Networks and Reflective Confidence Learning"; Dec. 2016 Amit Shaked and Lior Wolf; IEEE Conference on Computer Vision and Pattern Recognition (CVPR); 13 pgs.

"Disparity map generation technology based on convolutional neural network" Jan. 2018; Zhu Junpeng, Zhao Hongli and Yang Haitao; Journal of Computer Applications, 6 pgs.

"Research on Robot Target Localization based on Binocular Vision"; Jun. 2017; Lei Yan; A Dissertation Submitted to Guangdong University of Technology for the Degree of Master of Engineering Science, 71 pgs.

"Adaptive Depth Map Estimation from 3D Integral Image"; Oct. 2013; E.Alazawi, A.Aggoun, M.Abbod, O. Abdul Fatah and M.R. Swash;IEEE International Symposium on Broadband Multimedia Systems and Broadcasting (BMSB); 6 pgs.

"Deep Stereo Confidence Prediction for Depth Estimation"; 2017; IEEE International Conference on Image Processing (ICIP), 5 pgs.

First Office Action of the Chinese application No. 201810847268.7, dated May 12, 2020, 15 pgs.

"Confidence Inference for Focused Learning in Stereo Matching"; Sep. 2018; Ruichao Xiao, Wenxui Sun and Chingxi Yang; Computer Vision and Pattern Recognition; reprinted from the Internet at: https://arxiv.org/pdf/1809.09758.pdf, 10 pgs.

English Translation of the Written Opinion of the International Search Authority in the international application No. PCT/CN2019/082549, dated Jul. 19, 2019, 5 pgs.

\* cited by examiner

METHOD AND APPARATUS FOR ESTIMATING DEPTH OF BINOCULAR IMAGE, DEVICE, PROGRAM, AND MEDIUM

CROSS-REFERENCE TO RELATED APPLICATIONS

The present disclosure is a U.S. continuation application of International Application No. PCT/CN2019/082549, filed on Apr. 12, 2019, which claims priority to Chinese Patent Application No. 201810847268.7, filed on Jul. 27, 2018. The disclosures of International Application No. PCT/CN2019/082549 and Chinese Patent Application No. 201810847268.7 are incorporated herein by reference in their entireties.

BACKGROUND

With the development of machine learning technologies, deep learning networks have been applied to many real-world scenarios, such as autonomous driving. In these disclosures, prediction results are very important, especially in deep learning-based regression tasks, such as binocular stereo matching, and the prediction results are usually assumed to be accurate. However, such assumption is not reasonable enough. Wrongly predicted pixels in very important areas, such as relatively small obstacles, may cause a deep learning-based avoidance system to fail. In addition, the deployment of these deep learning networks in other scenarios may also cause poor or even unreasonable results.

SUMMARY

The present disclosure relates to computer vision technologies, and in particular, to a method and apparatus for estimating the depth of a binocular image, an electronic device, a computer program, and a storage medium.

Embodiments of the present disclosure provide solutions for estimating the depth of a binocular image.

According to one aspect of the embodiments of the present disclosure, provided is a method for estimating the depth of a binocular image, including:
inputting a to-be-processed binocular image into a predetermined neural network to obtain a parallax image and a confidence score image of the parallax image, where a discrete parameter of each pixel in a preset distribution in the parallax image has a negative correlation with a confidence score of the pixel; and
obtaining a depth image of the to-be-processed binocular image according to the parallax image.

According to another aspect of the embodiments of the present disclosure, provided is an apparatus for estimating the depth of a binocular image, including:
a parallax image acquiring unit, configured to input a to-be-processed binocular image into a predetermined neural network to obtain a parallax image and a confidence score image of the parallax image, where a discrete parameter of each pixel in a preset distribution in the parallax image has a negative correlation with a confidence score of the pixel; and
a depth image acquiring unit, configured to obtain a depth image of the to-be-processed binocular image according to the parallax image.

According to still another aspect of the embodiments of the present disclosure, provided is an electronic device, including the apparatus according to one or more embodiments.

According to yet another aspect of the embodiments of the present disclosure, provided is an electronic device, including:
a memory, configured to store executable instructions; and
a processor configured to execute the executable instructions so as to complete the method according to one or more embodiments.

According to yet another aspect of the embodiments of the present disclosure, provided is a computer program, including computer readable codes, where when the computer readable codes run on a device, a processor in the device executes instructions for implementing the method according to one or more embodiments.

According to yet another aspect of the embodiments of the present disclosure, provided is a computer storage medium, which configured to store computer-readable instructions, where the instructions are executed for implementing the method according to one or more embodiments.

Technical solutions of the present disclosure are further described in detail with reference to the accompanying drawings and embodiments as follows.

BRIEF DESCRIPTION OF THE ACCOMPANYING DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Based on the method and apparatus for estimating the depth of a binocular image, the electronic device, the computer program, and the storage medium provided in the foregoing embodiments of the present disclosure, a left view and a right view of a to-be-processed binocular image are input into a predetermined neural network to obtain a parallax image and a confidence score image thereof, where a discrete parameter of each pixel in a preset distribution in the parallax image has a negative correlation with a confidence score of the pixel; and then, a depth image of the to-be-processed binocular image is obtained according to the parallax image, and a corresponding confidence score image is obtained while obtaining the parallax image by using the predetermined neural network. The confidence score image corresponding to the parallax image may be obtained by means of unsupervised learning, without the need for confidence labeling as supervision. The confidence score has a physical meaning, i.e., the discrete parameter of each pixel in a preset distribution in the parallax image has a negative correlation with a confidence score of the pixel, and therefore, the confidence score image may be used for detecting possible error areas in the parallax image and assisting in the analysis of the parallax image, so as to obtain a more accurate depth image.

Various exemplary embodiments of the present disclosure are now described in detail with reference to the accompanying drawings. It should be noted that, unless otherwise stated specifically, relative arrangement of the components and operations, numerical expressions, and values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and disclosures or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include one or more systems, and the like.

The computer system/server may be described in the general context of computer system executable instructions (for example, program modules) executed by the computer system. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage mediums including storage devices.

Figure 1:
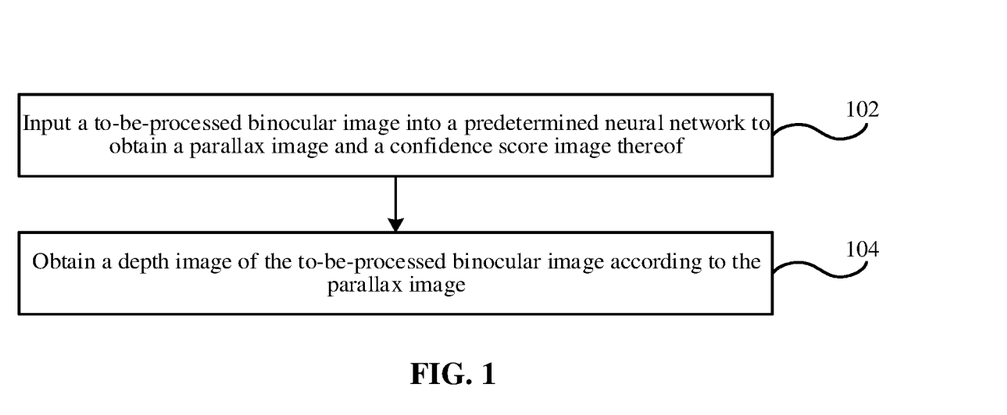
FIG. 1 is a flowchart of a method for estimating the depth of a binocular image according to some embodiments of the present disclosure.

FIG. 1 is a flowchart of a method for estimating the depth of a binocular image according to some embodiments of the present disclosure.

As shown in FIG. 1, the method includes the following operations.

At operation 102, a to-be-processed binocular image is input into a predetermined neural network to obtain a parallax image and a confidence score image thereof.

In some embodiments, the to-be-processed binocular image may be an image directly obtained from an image acquiring device, for example, the image acquiring device is a camera, etc., and may also be a pre-stored image obtained from a storage device, for example, the storage device is a USB flash drive, etc., and may further be an image obtained from a website server by means of a network. No limitation is made to the mode for obtaining the to-be-processed binocular image in the embodiments. A left view and a right view of the to-be-processed binocular image or a top view and a bottom view of the to-be-processed binocular image are input into the predetermined neural network to obtain the parallax image and the confidence score image thereof. The left and right views as well as the top and bottom views are two sets of opposite views, which may also be specifically referred to by other names. In the embodiments, no specific limitation is made, and the left view and the right view are used for description in the following embodiments. The parallax image may be a parallax image corresponding to the left view obtained based on the left view, or a parallax image corresponding to the right view obtained based on the right view, and no limitation is made thereto in the embodiments. The confidence score image may be an image obtained based on the parallax image for reflecting the confidence score of each pixel in the parallax image, where a discrete parameter of each pixel in a preset distribution in the parallax image has a negative correlation with the confidence score of the pixel, and the discrete parameter includes, but is not limited to, a standard deviation parameter.

In some embodiments, the predetermined neural network may be a neural network that is pre-determined before processing the left and right views of the to-be-processed binocular image; in this case, a required parallax image may be obtained by means of the predetermined neural network. The predetermined neural network may also be a neural network that is pre-trained before processing the left and right views of the to-be-processed binocular image; in this case, the left and right views of the to-be-processed binocular image may be images obtained from a training data set, and the predetermined neural network may be trained by the left and right views of the to-be-processed binocular image.

In an optional example, the predetermined neural network may include: a binocular stereo matching neural network, two convolution layers, and one normalization (Sigmoid) layer; the left and right views of the to-be-processed binocular image may be processed by the binocular stereo matching neural network, and then by the two convolution layers and the normalization layer sequentially to obtain the confidence score image. No limitation is made to network structures for obtaining the confidence score image in the embodiments.

At operation 104, a depth image of the to-be-processed binocular image is obtained according to the parallax image.

Optionally, after obtaining the parallax image of the to-be-processed binocular image, the depth image of the to-be-processed binocular image may be obtained by means of a geometric operation relationship between depth information and parallax information according to a projection model for camera imaging. No limitation is made to the method for obtaining the depth image according to the parallax image in the embodiments.

According to the method for estimating the depth of a binocular image provided in the embodiments, a left view and a right view of a to-be-processed binocular image are input into a predetermined neural network to obtain a parallax image and a confidence score image thereof, where a discrete parameter of each pixel in a preset distribution in the parallax image has a negative correlation with a confidence score of the pixel; and then, a depth image of the to-be-processed binocular image is obtained according to the parallax image, and a corresponding confidence score image is obtained while obtaining the parallax image by using the predetermined neural network. The confidence score image corresponding to the parallax image can be obtained by means of unsupervised learning, without the need for confidence labeling as supervision. The confidence score has a physical meaning, i.e., the discrete parameter of each pixel in a preset distribution in a parallax image has a negative correlation with a confidence score of the pixel, and therefore, a confidence score image may be used for detecting possible error areas in the parallax image and assisting in the analysis of the parallax image, so as to obtain a more accurate depth image.

In some embodiments, the predetermined neural network may be trained by using a loss function, where the loss function may be calculated from the confidence score of each pixel in the parallax image and the discrete parameter of the pixel in the preset distribution, i.e., according to the physical meaning of the confidence score, the discrete parameter of each pixel in a preset distribution in a parallax image has a negative correlation with a confidence score of the pixel; therefore, a loss function including the confidence score may be obtained, and the confidence score of the loss function may be used to optimize the loss function, so that the predetermined neural network trained with the loss function has better robustness.

Optionally, the loss function may include: a focus loss term and regularization terms, where the focus loss term may automatically adjust the weight of each pixel in the parallax image in the loss function by means of the confidence score, so that the pixels with higher confidence scores in the parallax image have greater weights, and the pixels with lower confidence scores in the parallax image have smaller weights, thus the learned confidence scores may be synchronously applied to the training process of the predetermined neural network to reduce the impact of noise in input data, for example, the noise in the input data is a blocked area in the to-be-processed binocular image, etc., such that the predetermined neural network may converge to a better stage and has better robustness.

Optionally, the regularization terms in the loss function may include: a regularization term related to the confidence score and a regularization term related to a predetermined neural network parameter, where the regularization term related to the confidence score can prevent the loss weights of the pixels with lower confidence scores in the parallax image from being too small, so as to ensure the training efficiency, and the regularization term related to the predetermined neural network parameter also becomes a weight regularization term, so as to prevent the predetermined neural network from overfitting during the training process.

Figure 2:
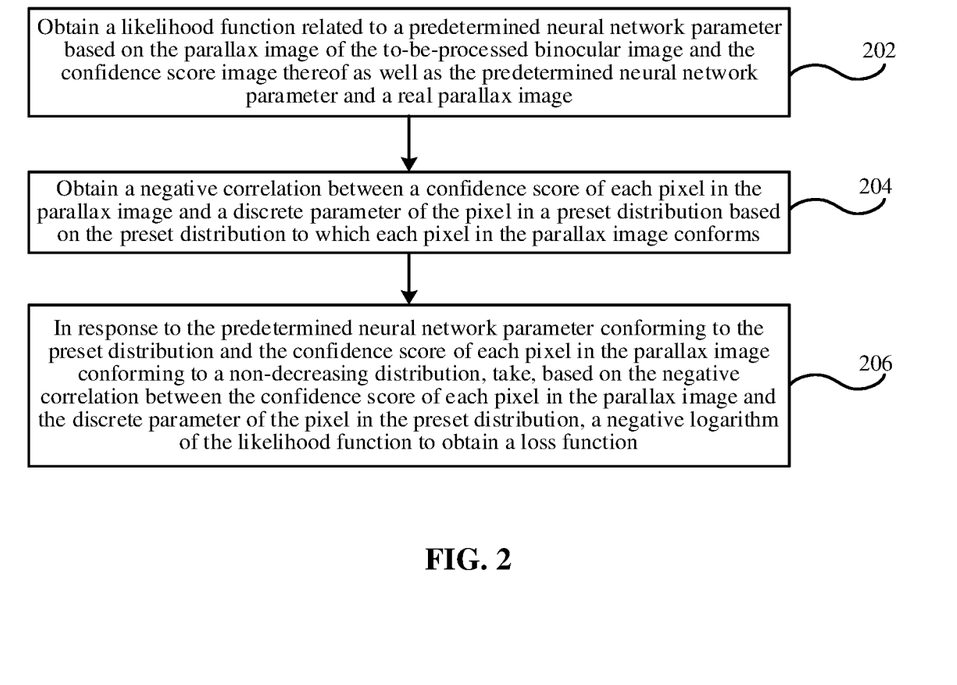
FIG. 2 is a flowchart of obtaining a loss function including a confidence score according to some embodiments of the present disclosure.

FIG. 2 is a flowchart of obtaining a loss function including a confidence score according to some embodiments of the present disclosure.

As shown in FIG. 2, the method includes the following operations.

At operation 202, a likelihood function related to a predetermined neural network parameter is obtained based on a parallax image and a confidence score image of a to-be-processed binocular image as well as the predetermined neural network parameter and a real parallax image.

Optionally, according to the Bayesian probability theory, the likelihood function related to the predetermined neural network parameter may be obtained based on the parallax image of the to-be-processed binocular image and the confidence score image thereof as well as the predetermined neural network parameter and the real parallax image.

At operation 204, a negative correlation between a confidence score of each pixel in the parallax image and a discrete parameter of the pixel in a preset distribution is obtained based on the preset distribution to which each pixel in the parallax image conforms.

Optionally, the negative correlation between the confidence score of each pixel in the parallax image and the discrete parameter of the pixel in the preset distribution may be obtained by enabling the pixels in the parallax image to conform to preset distributions with different standard deviations.

At operation 206, in response to the predetermined neural network parameter conforming to the preset distribution and the confidence score of each pixel in the parallax image conforming to a non-decreasing distribution, a negative logarithm of the likelihood function is taken based on the negative correlation between the confidence score of each pixel in the parallax image and the discrete parameter of the pixel in the preset distribution to obtain the loss function.

Optionally, the predetermined neural network parameter may conform to a preset distribution with a mean value of 0 and a standard deviation of 1.

Optionally, the preset distribution may be a Laplacian distribution or a Gaussian distribution.

In some embodiments, in response to a case where the preset distribution is the Laplacian distribution, the loss function includes: a focus loss term obtained from an average value of ratios of absolute values of differences between parallax values of the pixels in the parallax image and in a real parallax image to the confidence scores of the pixels, a regularization term obtained from an average value of the confidence scores of the pixels in the parallax image, and a regularization term obtained from the predetermined neural network parameter.

According to the Bayesian probability theory, the likelihood function related to the predetermined neural network parameter, which is obtained based on the parallax image of the to-be-processed binocular image and the confidence score image thereof as well as the predetermined neural network parameter and the real parallax image, is:

$$\frac{1}{N}\prod_i^N P(y_i, c_i, w \mid x) = \frac{1}{N}\prod_i^N P(y_i \mid c_i, w, x)P(c_i \mid w, x)P(w \mid x) \quad \text{(Formula I)}$$

where, $x=\{x_1, x_2, \ldots, x_T\}$ is the to-be-processed binocular image; $y=\{y_1, y_2, \ldots, y_N\}$ is the real parallax image, where T and N are respectively the numbers of pixels in the to-be-processed binocular image and in the real parallax image; w is the predetermined neural network parameter; and $c=\{c_1, c_2, \ldots, c_N\}$ is the confidence score image.

On the basis that the pixels in the parallax image conform to the Laplacian distribution with different standard deviations:

$$P(y_i \mid w, x) \propto \frac{1}{2b}e^{-\frac{|y_i - f_i^w(x)|}{b}} \quad \text{(Formula II)}$$

it is obtained that the negative correlation between the confidence score of each pixel in the parallax image and the discrete parameter of the pixel in the Laplacian distribution is:

$$b_i = f(c_i) = -kc_i + a \quad \text{(Formula III)}$$

where $b = \{b_1, b_2, \ldots, b_N\}$ is the Laplacian distribution with different standard deviations, and $b_i$ is the standard deviation parameter of the Laplace distribution, i.e., the discrete parameter; as a random variable, $c_i \in [0,1]$ represents a negative correlation with a linear decreasing function of $b_i$ and $c_i$; and k and a are two normal numbers satisfying $a \geq k+1$, so that $b_i \geq 1$ is always satisfied.

On the basis that the predetermined neural network parameter conforms to the Laplacian distribution with a mean value of 0 and a standard deviation of 1:

$$P(w|x) \propto e^{-|w|} \quad \text{(Formula IV)}$$

On the basis that the confidence score of each pixel in the parallax image conforms to a non-decreasing distribution, where $\gamma \geq 0$:

$$P(c_i|w,x) \propto c_i^\gamma \quad \text{(Formula V)}$$

formulas II, III, IV, and V are substituted into formula I, and a negative logarithm of the likelihood function is taken to obtain the loss function:

$$\hat{L}(w) = \quad \text{(Formula VI)}$$

$$\frac{1}{N}\sum_i^N \underbrace{\frac{|y_i - f^w(x)|}{-kc_i + a}}_{\text{Focus loss term}} + \underbrace{\log 2(-kc_i + a) - \gamma \log c_i}_{\text{Confidence score regularization term}} + \underbrace{\lambda|w|}_{\text{Weight regularization term}}$$

In some other embodiments, in response to a case where the preset distribution is Gaussian distribution, the loss function includes: a focus loss term obtained from an average value of ratios of squares of differences between parallax values of pixels in the parallax image and in the real parallax image to the confidence scores of the pixels, a regularization term obtained from an average value of the confidence scores of the pixels in the parallax image, and a regularization term obtained from the predetermined neural network parameter.

According to the Bayesian probability theory, the likelihood function related to the predetermined neural network parameter, which is obtained based on the parallax image of the to-be-processed binocular image and the confidence score image thereof as well as the predetermined neural network parameter and the real parallax image, is:

$$\frac{1}{N}\prod_i^N P(y_i, c_i, w | x) = \quad \text{(Formula I)}$$

$$\frac{1}{N}\prod_i^N P(y_i | c_i, w, x) P(c_i | w, x) P(w | x)$$

where, $x = \{x_1, x_2, \ldots, x_T\}$ is the to-be-processed binocular image; $y = \{y_1, y_2, \ldots, y_N\}$ is the real parallax image, where T and N are respectively the numbers of pixels in the to-be-processed binocular image and in the real parallax image; w is the predetermined neural network parameter; and $c = \{c_1, c_2, \ldots, c_N\}$ is the confidence score image.

On the basis that the pixels in the parallax image conform to Gaussian distribution with different standard deviations:

$$P(y_i | w, x) \propto \frac{1}{b} e^{-\frac{|y_i - f_i^w(x)|^2}{2b^2}} \quad \text{(Formula VII)}$$

it can be obtained that the negative correlation between the confidence score of each pixel in the parallax image and the discrete parameter of the pixel in the Gaussian distribution is:

$$b_i = f(c_i) = -kc_i + a \quad \text{(Formula III)}$$

where, $b = \{b_1, b_2, \ldots, b_N\}$ is the Gaussian distribution with different standard deviations, and $b_i$ is the standard deviation parameter of the Gaussian distribution, i.e., the discrete parameter; as a random variable, $c_i \in [0,1]$ represents a negative correlation with a linear decreasing function of $b_i$ and $c_i$; and k and a are two normal numbers satisfying $a \geq k+1$, so that $b_i \geq 1$ is always satisfied.

On the basis that the predetermined neural network parameter conforms to the Gaussian distribution with a mean value of 0 and a standard deviation of 1:

$$P(w|x) \propto e^{-|w|^2} \quad \text{(Formula VIII)}$$

On the basis that the confidence score of each pixel in the parallax image conforms to a non-decreasing distribution, where $\gamma \geq 0$:

$$P(c_i|w,x) \propto c_i^\gamma \quad \text{(Formula V)}$$

formulas VII, III, VIII, and V are substituted into formula I, and a negative logarithm of the likelihood function is taken to obtain the loss function:

$$\hat{L}(w) = \frac{1}{N}\sum_i^N \underbrace{\frac{(y_i - f^w(x))^2}{-kc_i + a}}_{\text{Focus loss term}} + \quad \text{(Formula IX)}$$

$$\underbrace{0.5\log(-kc_i + a) - \gamma \log c_i}_{\text{Confidence score regularization term}} + \underbrace{\lambda|w|}_{\text{Weight regularization term}}$$

The method according to the foregoing embodiments of the present disclosure is applicable to image processing of a mobile terminal or an automatic driving device or the like, where the mobile terminal is, for example, a mobile phone, a tablet computer, etc.

Figure 3:
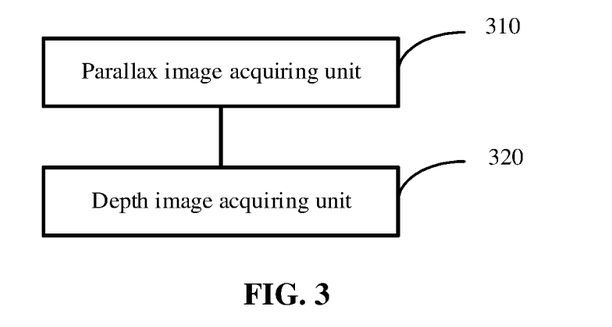
FIG. 3 is a schematic structural diagram of an apparatus for estimating the depth of a binocular image according to some embodiments of the present disclosure.

FIG. 3 is a schematic structural diagram of an apparatus for estimating the depth of a binocular image according to some embodiments of the present disclosure.

As shown in FIG. 3, the apparatus includes: a parallax image acquiring unit 310 and a depth image acquiring unit 320.

The parallax image acquiring unit 310 is configured to input a to-be-processed binocular image into a predetermined neural network to obtain a parallax image and a confidence score image thereof.

In some embodiments, the to-be-processed binocular image may be an image directly obtained from an image acquiring device, for example, the image acquiring device is a camera, etc., and may also be a pre-stored image obtained from a storage device, for example, the storage device is a USB flash drive, etc., and may further be an image obtained from a website server by means of a network. No limitation is made to the mode for obtaining the to-be-processed binocular image in the embodiments. A left view and a right view of the to-be-processed binocular image or a top view and a bottom view of the to-be-processed binocular image are input into the predetermined neural network to obtain the parallax image and the confidence score image thereof. The left and right views as well as the top and bottom views are two sets of opposite views, which may also be specifically referred to by other names. In the embodiments, no specific limitation is made, and the left view and the right view are used for description in the following embodiments. The parallax image may be a parallax image corresponding to the left view obtained based on the left view, or a parallax image corresponding to the right view obtained based on the right view, and no limitation is made thereto in the embodiments. The confidence score image may be an image obtained based on the parallax image for reflecting the confidence score of each pixel in the parallax image, where a discrete parameter of each pixel in a preset distribution in the parallax image has a negative correlation with the confidence score of the pixel, and the discrete parameter includes, but is not limited to, a standard deviation parameter.

In some embodiments, the predetermined neural network may be a neural network that is pre-determined before processing the left and right views of the to-be-processed binocular image; in this case, a required parallax image may be obtained by means of the predetermined neural network. The predetermined neural network may also be a neural network that is pre-trained before processing the left and right views of the to-be-processed binocular image; in this case, the left and right views of the to-be-processed binocular image may be images obtained from a training data set, and the predetermined neural network may be trained by the left and right views of the to-be-processed binocular image.

In an optional example, the predetermined neural network may include: a binocular stereo matching neural network, two convolution layers, and one normalization (Sigmoid) layer. The parallax image acquiring unit 310 can process the left and right views of the to-be-processed binocular image by the binocular stereo matching neural network, and then by the two convolution layers and the normalization layer sequentially to obtain the confidence score image. No limitation is made to network structures for obtaining the confidence score image in the embodiments.

The depth image acquiring unit 320 is configured to obtain a depth image of the to-be-processed binocular image according to the parallax image.

Optionally, after obtaining the parallax image of the to-be-processed binocular image, the depth image of the to-be-processed binocular image may be obtained by means of a geometric operation relationship between depth information and parallax information according to a projection model for camera imaging. No limitation is made to the method for obtaining the depth image according to the parallax image in the embodiments.

According to the apparatus for estimating the depth of a binocular image provided in the embodiments, a left view and a right view of a to-be-processed binocular image are input into a predetermined neural network to obtain a parallax image and a confidence score image thereof, where a discrete parameter of each pixel in a preset distribution in the parallax image has a negative correlation with a confidence score of the pixel; and then, a depth image of the to-be-processed binocular image is obtained according to the parallax image, and a corresponding confidence score image is obtained while obtaining the parallax image by using the predetermined neural network. The confidence score image corresponding to the parallax image can be obtained by means of unsupervised learning, without the need for confidence labeling as supervision. The confidence score has a physical meaning, i.e., the discrete parameter of each pixel in a preset distribution in a parallax image has a negative correlation with a confidence score of the pixel, and therefore, a confidence score image may be used for detecting possible error areas in the parallax image and assisting in the analysis of the parallax image, so as to obtain a more accurate depth image.

In some embodiments, the apparatus for estimating the depth of a binocular image may further include: a neural network training unit, configured to train a predetermined neural network by using a loss function, where the loss function may be calculated from the confidence score of each pixel in the parallax image and the discrete parameter of the pixel in the preset distribution, i.e., according to the physical meaning of the confidence score, the discrete parameter of each pixel in a preset distribution in a parallax image has a negative correlation with a confidence score of the pixel; therefore, a loss function including the confidence score may be obtained, and the confidence score of the loss function may be used to optimize the loss function, so that the predetermined neural network trained with the loss function has better robustness.

Optionally, the loss function may include: a focus loss term and regularization terms, where the focus loss term may automatically adjust the weight of each pixel in the parallax image in the loss function by means of the confidence score, so that the pixels with higher confidence scores in the parallax image have greater weights, and the pixels with lower confidence scores in the parallax image have smaller weights, thus the learned confidence scores may be synchronously applied to the training process of the predetermined neural network to reduce the impact of noise in input data, for example, the noise in the input data is a blocked area in the to-be-processed binocular image, etc., such that the predetermined neural network may converge to a better stage and has better robustness.

Optionally, the regularization terms in the loss function may include: a regularization term related to the confidence score and a regularization term related to a predetermined neural network parameter, where the regularization term related to the confidence score can prevent the loss weights of the pixels with lower confidence scores in the parallax image from being too small, so as to ensure the training efficiency, and the regularization term related to the predetermined neural network parameter also becomes a weight regularization term, so as to prevent the predetermined neural network from overfitting during the training process.

Optionally, the neural network training unit may further include: a loss function acquiring module, configured to obtain a loss function including a confidence score.

In an optional example, the loss function acquiring module may obtain a likelihood function related to the predetermined neural network parameter based on the parallax image of the to-be-processed binocular image and the confidence score image thereof as well as the predetermined neural network parameter and a real parallax image; obtain a negative correlation between the confidence score of each pixel in the parallax image and the discrete parameter of the pixel in the preset distribution based on the preset distribution to which each pixel in the parallax image conforms; and in response to the predetermined neural network parameter conforming to the preset distribution and the confidence score of each pixel in the parallax image conforming to a non-decreasing distribution, take, based on the negative correlation between the confidence score of each pixel in the parallax image and the discrete parameter of the pixel in the preset distribution, a negative logarithm of the likelihood function to obtain the loss function.

Optionally, based on the parallax image of the to-be-processed binocular image and the confidence score image thereof as well as the predetermined neural network parameter and the real parallax image, the loss function acquiring module may obtain the likelihood function related to the predetermined neural network parameter according to the Bayesian probability theory.

Optionally, the loss function acquiring module may obtain the negative correlation between the confidence score of each pixel in the parallax image and the discrete parameter of the pixel in the preset distribution by enabling the pixels in the parallax image to conform to the preset distribution with different standard deviations.

Optionally, the predetermined neural network parameter may conform to a preset distribution with a mean value of 0 and a standard deviation of 1.

Optionally, the preset distribution may be a Laplacian distribution or a Gaussian distribution.

In some embodiments, in response to a case where the preset distribution is the Laplacian distribution, the loss function includes: a focus loss term obtained from an average value of ratios of absolute values of differences between parallax values of the pixels in the parallax image and in a real parallax image to the confidence scores of the pixels, a regularization term obtained from an average value of the confidence scores of the pixels in the parallax image, and a regularization term obtained from the predetermined neural network parameter.

In some other embodiments, in response to a case where the preset distribution is Gaussian distribution, the loss function includes: a focus loss term obtained from an average value of ratios of squares of differences between parallax values of pixels in the parallax image and in the real parallax image to the confidence scores of the pixels, a regularization term obtained from an average value of the confidence scores of the pixels in the parallax image, and a regularization term obtained from the predetermined neural network parameter.

Figure 4:
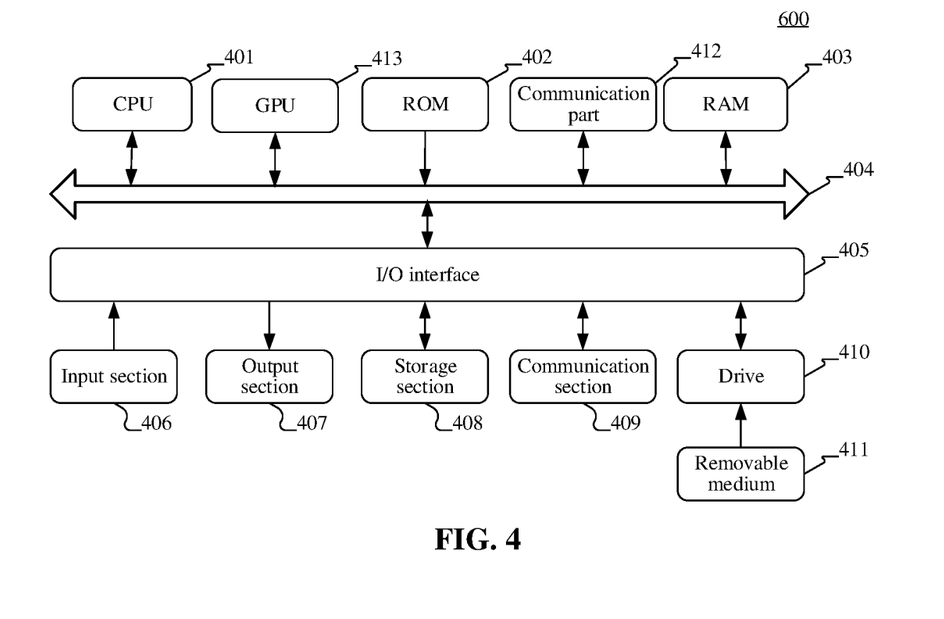
FIG. 4 is a schematic structural diagram of an electronic device provided by some embodiments of the present disclosure.

The embodiments of the present disclosure further provide an electronic device which, for example, may be a mobile terminal, a Personal Computer (PC), a tablet computer, a server, etc. Referring to FIG. 4 below, a schematic structural diagram of an electronic device 400, which may be a terminal device or a server, suitable for implementing the embodiments of the present disclosure is shown. As shown in FIG. 4, the electronic device 400 includes one or more processors, a communication unit, etc. The one or more processors are, for example, one or more Central Processing Units (CPUs) 401 and/or one or more Graphic Processing Units (GPUs) 413, and may execute appropriate actions and processing according to executable instructions stored in a Read-Only Memory (ROM) 402 or executable instructions loaded from a storage section 408 to a Random Access Memory (RAM) 403. A communication unit 412 may include, but is not limited to, a network card. The network card may include, but is not limited to, an IB (Infiniband) network card. The processor may communicate with the ROM 402 and/or the random RAM 403 to execute the executable instructions, be connected to the communication unit 412 by means of a bus 404, and communicate with other target devices by means of the communication unit 412, so as to implement operations corresponding to any one of the methods provided in the embodiments of the present disclosure, for example, inputting a left view and a right view of a to-be-processed binocular image into a predetermined neural network to obtain a parallax image and a confidence score image thereof, where a discrete parameter of each pixel in a preset distribution in the parallax image has a negative correlation with a confidence score of the pixel; and obtaining a depth image of the to-be-processed binocular image according to the parallax image.

In addition, the RAM 403 can further store various programs and data required for operations of an apparatus. The CPU 401, the ROM 402, and the RAM 403 are connected to each other by means of the bus 404. In the presence of the RAM 403, the ROM 402 is an optional module. The RAM 403 stores executable instructions, or writes the executable instructions into the ROM 402 during running, where the executable instructions cause the CPU 401 to execute corresponding operations of the foregoing communication method. An Input/Output (I/O) interface 405 is also connected to the bus 404. The communication unit 412 may be integrated, or may be configured to have multiple sub-modules (for example, multiple IB network cards) connected to the bus.

The following components are connected to the I/O interface 405: an input section 406 including a keyboard, a mouse and the like; an output section 407 including a Cathode-Ray Tube (CRT), a Liquid Crystal Display (LCD), a speaker and the like; a storage section 408 including a hard disk and the like; and a communication section 409 of a network interface card, including an LAN card, a modem and the like. The communication section 409 performs communication processing via a network such as the Internet. A drive 410 is also connected to the I/O interface 405 according to requirements. A removable medium 411, such as a magnetic disk, an optical disk, a magneto-optical disk, and a semiconductor memory, is installed on the drive 410 according to requirements, so as to facilitate the installation of a computer program read from the removable medium onto the storage section 408 according to requirements.

It should be noted that the architecture illustrated in FIG. 4 is merely an optional implementation mode. During specific practice, the number and types of the components in FIG. 4 may be selected, decreased, increased, or replaced according to actual requirements. Different functional components may be separated or integrated or arranged in other mode. For example, the GPU 413 and the CPU 401 may be separated, or the GPU 413 may be integrated on the CPU 401, and the communication unit may be separated from or integrated on the CPU 401 or the GPU 413, etc. These alternative implementation modes all fall within the scope of protection of the present disclosure.

Particularly, the process described above with reference to the flowchart according to the embodiments of the present disclosure may be implemented as a computer software program. For example, the embodiments of the present disclosure include a computer program product, including a computer program tangibly included on a machine readable medium. The computer program includes program codes for executing the method shown in the flowchart. The program codes may include corresponding instructions for correspondingly executing the operations of the method provided in the embodiments of the present disclosure, for example, inputting a left view and a right view of a to-be-processed binocular image into a predetermined neural network to obtain a parallax image and a confidence score image thereof, where a discrete parameter of each pixel in a preset distribution in the parallax image has a negative correlation with a confidence score of the pixel; and obtaining a depth image of the to-be-processed binocular image according to the parallax image. In such embodiments, the computer program may be downloaded and installed from the network via the communication section 409, and/or is installed from the removable medium 411. The computer program, when being executed by the CPU 401, executes the foregoing functions defined in the method of the present disclosure.

In one or more optional implementation modes, the embodiments of the present disclosure further provide a computer program product, configured to store computer-readable instructions, where when the instructions are executed, a computer executes the method for estimating the depth of the binocular image in any of the foregoing possible embodiments.

The computer program product can be specifically implemented by means of hardware, software, or a combination thereof. In an optional example, the computer program product is specifically embodied as a computer storage medium. In another optional example, the computer program product is embodied as a software product, such as a Software Development Kit (SDK).

In one or more optional implementation modes, the embodiments of the present disclosure further provide a method for estimating the depth of a binocular image and an apparatus corresponding thereto, an electronic device, a computer storage medium, a computer program, and a computer program product, where the method includes: sending, by a first apparatus, a binocular image-based depth estimation instruction to a second apparatus, where the instruction instructs the second apparatus to execute the method for estimating the depth of a binocular image according to one or more possible embodiments; and receiving, by the first apparatus, a binocular image depth estimation result sent by the second apparatus.

In some embodiments, the binocular image-based depth estimation instruction is specifically an invoking instruction. The first apparatus instructs, by means of invoking, the second apparatus to execute binocular image depth estimation. Accordingly, in response to the reception of the invoking instruction, the second apparatus executes the operations and/or process in one or more embodiments of the method for estimating the depth of a binocular image.

It should be understood that the terms such as "first" and "second" in the embodiments of the present disclosure are only used for distinguishing, and shall not be understood as limitations to the embodiments of the present disclosure.

It should also be understood that, in the present disclosure, "multiple" may refer to two or more, and "at least one" may refer to one, two or more.

It should also be understood that, for any component, data or structure mentioned in the present disclosure, if there is no explicit limitation or no opposite motivation given in context, it is generally understood that the number of the component, data or structure is one or more.

It should also be understood that, the descriptions of the embodiments in the present disclosure focus on differences between embodiments, and the same or similar parts therebetween may be used as reference and are omitted for clarity.

The method and apparatus according to the present disclosure may be implemented in many manners. For example, the method and apparatus in the present disclosure may be implemented with software, hardware, firmware, or any combination of software, hardware, and firmware. The foregoing sequence of operations of the method is merely for description, and unless otherwise stated particularly, is not intended to limit the operations of the method according to the present disclosure. In addition, in some embodiments, the present disclosure is also implemented as programs recorded in a recording medium. The programs include machine-readable instructions for implementing the method according to the present disclosure. Therefore, the present disclosure further covers the recording medium storing the programs for executing the method according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual disclosure of the present disclosure, and to enable a person of ordinary skill in the art to understand the present disclosure, so as to design various embodiments with various modifications applicable to particular use.

What is claimed is:

1. A method for estimating a depth of a binocular image, comprising:
    inputting a to-be-processed binocular image into a predetermined neural network to obtain a parallax image and a confidence score image of the parallax image, wherein a discrete parameter of each pixel in a preset distribution in the parallax image has a negative correlation with a confidence score of the pixel; and
    obtaining a depth image of the to-be-processed binocular image according to the parallax image,
    wherein the method further comprises:
        calculating a loss function from the discrete parameter of each pixel in the preset distribution in the parallax image and the confidence score of the pixel; and
        training the predetermined neural network by using the loss function.

2. The method according to claim 1, wherein the inputting a to-be-processed binocular image into a predetermined neural network to obtain a confidence score image comprises:
    processing the to-be-processed binocular image by a binocular stereo matching neural network, and then by two convolution layers and one normalization layer sequentially to obtain the confidence score image.

3. The method according to claim 1, wherein the loss function comprises: regularization terms and a focus loss term that adjusts a weight of each pixel in the parallax image in the loss function.

4. The method according to claim 3, wherein the regularization terms comprise: a regularization term related to the confidence score and a regularization term related to a predetermined neural network parameter.

5. The method according to claim 1, wherein the calculating a loss function from the discrete parameter of each pixel in the preset distribution in the parallax image and the confidence score of the pixel comprises:
    obtaining, based on the parallax image and the confidence score image of the parallax image as well as a predetermined neural network parameter and a real parallax image, a likelihood function related to the predetermined neural network parameter;

obtaining the negative correlation between the discrete parameter of each pixel in the preset distribution in the parallax image and the confidence score of the pixel based on the preset distribution to which each pixel in the parallax image conforms; and in response to the predetermined neural network parameter conforming to the preset distribution and the confidence score of each pixel in the parallax image conforming to a non-decreasing distribution, taking, based on the negative correlation between the discrete parameter of each pixel in the preset distribution in the parallax image and the confidence score of the pixel, a negative logarithm of the likelihood function to obtain the loss function.

6. The method according to claim 1, wherein the preset distribution comprises a Laplacian distribution or a Gaussian distribution.

7. The method according to claim 6, wherein in response to the preset distribution being the Laplacian distribution, the loss function comprises: a focus loss term obtained from an average value of ratios, each being a ratio of an absolute value of a difference between a parallax value of each of pixels in the parallax image and a parallax value of a respective one of pixels in a real parallax image to the confidence score of the pixel, a regularization term obtained from an average value of confidence scores of the pixels in the parallax image, and a regularization term obtained from a predetermined neural network parameter.

8. The method according to claim 6, wherein in response to the preset distribution being the Gaussian distribution, the loss function comprises: a focus loss term obtained from an average value of ratios, each being a ratio of a square of a difference between a parallax value of each of pixels in the parallax image and a parallax value of a respective one of pixels in a real parallax image to the confidence score of the pixel, a regularization term obtained from an average value of confidence scores of the pixels in the parallax image, and a regularization term obtained from a predetermined neural network parameter.

9. An electronic device, comprising:
a memory, configured to store executable instructions; and
a processor, configured to execute the executable instructions, when the executable instructions are executed, the processor is configured to:
input a to-be-processed binocular image into a predetermined neural network to obtain a parallax image and a confidence score image of the parallax image, wherein a discrete parameter of each pixel in a preset distribution in the parallax image has a negative correlation with a confidence score of the pixel; and
obtain a depth image of the to-be-processed binocular image according to the parallax image,
wherein the processor is further configured to:
calculate a loss function from the discrete parameter of each pixel in the preset distribution in the parallax image and the confidence score of the pixel; and
train the predetermined neural network by using the loss function.

10. The electronic device according to claim 9, wherein the processor is further configured to process the to-be-processed binocular image by a binocular stereo matching neural network, and then by two convolution layers and one normalization layer sequentially to obtain the confidence score image.

11. The electronic device according to claim 9, wherein the loss function comprises: regularization terms and a focus loss term that adjusts a weight of each pixel in the parallax image in the loss function.

12. The electronic device according to claim 11, wherein the regularization terms comprise: a regularization term related to the confidence score and a regularization term related to a predetermined neural network parameter.

13. The electronic device according to claim 9, wherein the processor is further configured to: obtain, based on the parallax image and the confidence score image of the parallax image as well as a predetermined neural network parameter and a real parallax image, a likelihood function related to the predetermined neural network parameter; obtain the negative correlation between the discrete parameter of each pixel in the preset distribution in the parallax image and the confidence score of the pixel based on the preset distribution to which each pixel in the parallax image conforms; and in response to the predetermined neural network parameter conforming to the preset distribution and the confidence score of each pixel in the parallax image conforming to a non-decreasing distribution, take, based on the negative correlation between the discrete parameter of each pixel in the preset distribution in the parallax image and the confidence score of the pixel, a negative logarithm of the likelihood function to obtain the loss function.

14. The electronic device according to claim 9, wherein the preset distribution comprises a Laplacian distribution or a Gaussian distribution.

15. The electronic device according to claim 14, wherein in response to the preset distribution being the Laplacian distribution, the loss function comprises: a focus loss term obtained from an average value of ratios, each being a ratio of an absolute value of a difference between a parallax value of each of pixels in the parallax image and a parallax value of a respective one of pixels in a real parallax image to the confidence score of the pixel, a regularization term obtained from an average value of confidence scores of the pixels in the parallax image, and a regularization term obtained from a predetermined neural network parameter.

16. The electronic device according to claim 14, wherein in response to the preset distribution being the Gaussian distribution, the loss function comprises: a focus loss term obtained from an average value of ratios, each being a ratio of a square of a difference between a parallax value of each of pixels in the parallax image and a parallax value of a respective one of pixels in a real parallax image to the confidence score of the pixel, a regularization term obtained from an average value of confidence scores of the pixels in the parallax image, and a regularization term obtained from a predetermined neural network parameter.

17. A non-transitory computer storage medium configured to store computer readable instructions, wherein when the computer readable instructions are executed, the following operations are performed:
inputting a to-be-processed binocular image into a predetermined neural network to obtain a parallax image and a confidence score image of the parallax image, wherein a discrete parameter of each pixel in a preset distribution in the parallax image has a negative correlation with a confidence score of the pixel; and
obtaining a depth image of the to-be-processed binocular image according to the parallax image, wherein when the computer readable instructions are executed, the following operations are further performed:

calculating a loss function from the discrete parameter of each pixel in the preset distribution in the parallax image and the confidence score of the pixel; and training the predetermined neural network by using the loss function.

18. The non-transitory computer storage medium of claim 17, wherein the inputting a left view and a right view of a to-be-processed binocular image into a predetermined neural network to obtain a confidence score image comprises:

processing the to-be-processed binocular image by a binocular stereo matching neural network, and then by two convolution layers and one normalization layer sequentially to obtain the confidence score image.

* * * * *